United States Patent [19]
Laurenceau et al.

[11] Patent Number: 5,772,427
[45] Date of Patent: Jun. 30, 1998

[54] BURNER AND UTILIZATION OF SUCH A BURNER IN A GLASS FURNACE

[75] Inventors: Serge Laurenceau, Versailles, France; Louis Philippe, Oakbrook Terrace, Ill.; Jean-Yves Iatrides, St Maur des Fosses; Michel Verlhac, Chatillon, both of France

[73] Assignee: L'Air Liquide, Societe Anonyme pour l'Etudes et l'Exploitation des Procedes Georges Claude, Paris, France

[21] Appl. No.: 583,509

[22] Filed: Jan. 5, 1996

[51] Int. Cl.⁶ .................................................. F23D 11/36
[52] U.S. Cl. ........................ 431/154; 431/181; 431/186
[58] Field of Search ..................................... 431/186, 189, 431/151, 155, 159, 181, 154, 180

[56] References Cited

U.S. PATENT DOCUMENTS

| | | | |
|---|---|---|---|
| 1,412,023 | 4/1922 | Erickson | 431/186 |
| 2,087,869 | 7/1937 | Blodgett | 431/186 |
| 2,935,128 | 5/1960 | Ferguson | 431/186 |
| 3,533,717 | 10/1970 | Guerin | 431/186 |
| 4,347,218 | 8/1982 | Posch | 431/189 |
| 5,545,033 | 8/1996 | Dick | 431/181 |

*Primary Examiner*—James C. Yeung
*Attorney, Agent, or Firm*—Burns, Doane, Swecker & Mathis, LLP

[57] ABSTRACT

The burner comprises a tap-hole block (1), a burner body (C) substantially comprised of a tubular element (2), at least one injection blowpipe (3) extending through the burner body and into the cavity (P) of the tap-hole block (1), and unlockable quick mounting means (22, 20, 16, 23, 26, 28) for mounting the injection blowpipe (3) to the tubular elements (2) and the tubular element (2) to the tap-hole block (1). Application particularly to the oxicombustion in glass furnaces.

12 Claims, 3 Drawing Sheets

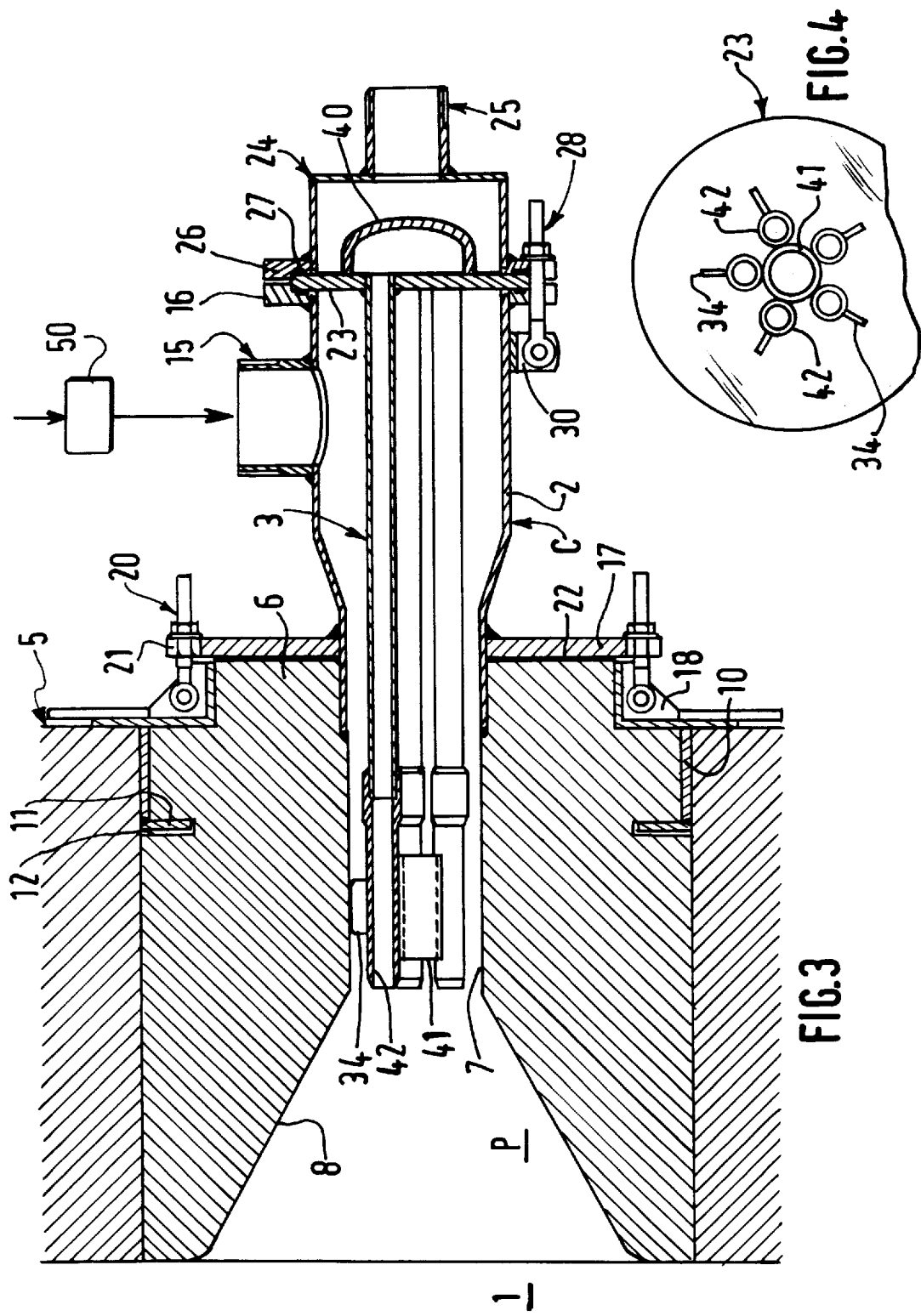

1

BURNER AND UTILIZATION OF SUCH A BURNER IN A GLASS FURNACE

FIELD OF THE INVENTION

The present invention relates to burners, in particular oxyfuel burners, of the type comprising a burner body intended to be mounted on a tap-hole block made of refractory material defining a cavity and supporting at least one internal injection pipe.

DESCRIPTION OF THE RELATED ART

In known burners of this type, the burner body, which usually defines the internal passage for supplying oxidizing gas, generally has a complicated architecture and complicated geometry produced in cast metal and/or in several parts, usually comprising means for permanent fastening to the tap-hole block.

OBJECTS AND SUMMARY

The object of the present invention is to propose a burner arrangement having a particularly simple and lightweight design, which can be demounted easily and as a whole, allowing many adaptations, especially for various fuels, while at the same time maintaining a large number of parts common to the various versions.

In order to achieve this, according to one characteristic of the invention, the burner body comprises a tubular element, the injection pipe is fastened, at a first end, to a supporting structure and includes, at its second end, spacing and centering means and the burner includes first means for quickly mounting/demounting the supporting structure on/from the tubular element.

The present invention also relates to the utilization of such a burner in a glass furnace, the burner being typically fed with a gaseous oxidizing agent containing at least 90% oxygen advantageously provided with an air separation unit operating by adsorption, of the so-called "VSA" type.

BRIEF DESCRIPTION OF THE DRAWING FIGURES

Other characteristics and advantages of the present invention will emerge from the following description of embodiments, given by way of illustration but in no way implying limitation, in conjunction with the appended drawings, in which:

FIG. 3 is a diagrammatic view, similar to that in FIG. 1, of a third embodiment of a burner according to the invention; and FIG. 4 is an end view of the injection subassembly of FIG. 3.

DETAILED DESCRIPTION

Figure 1:
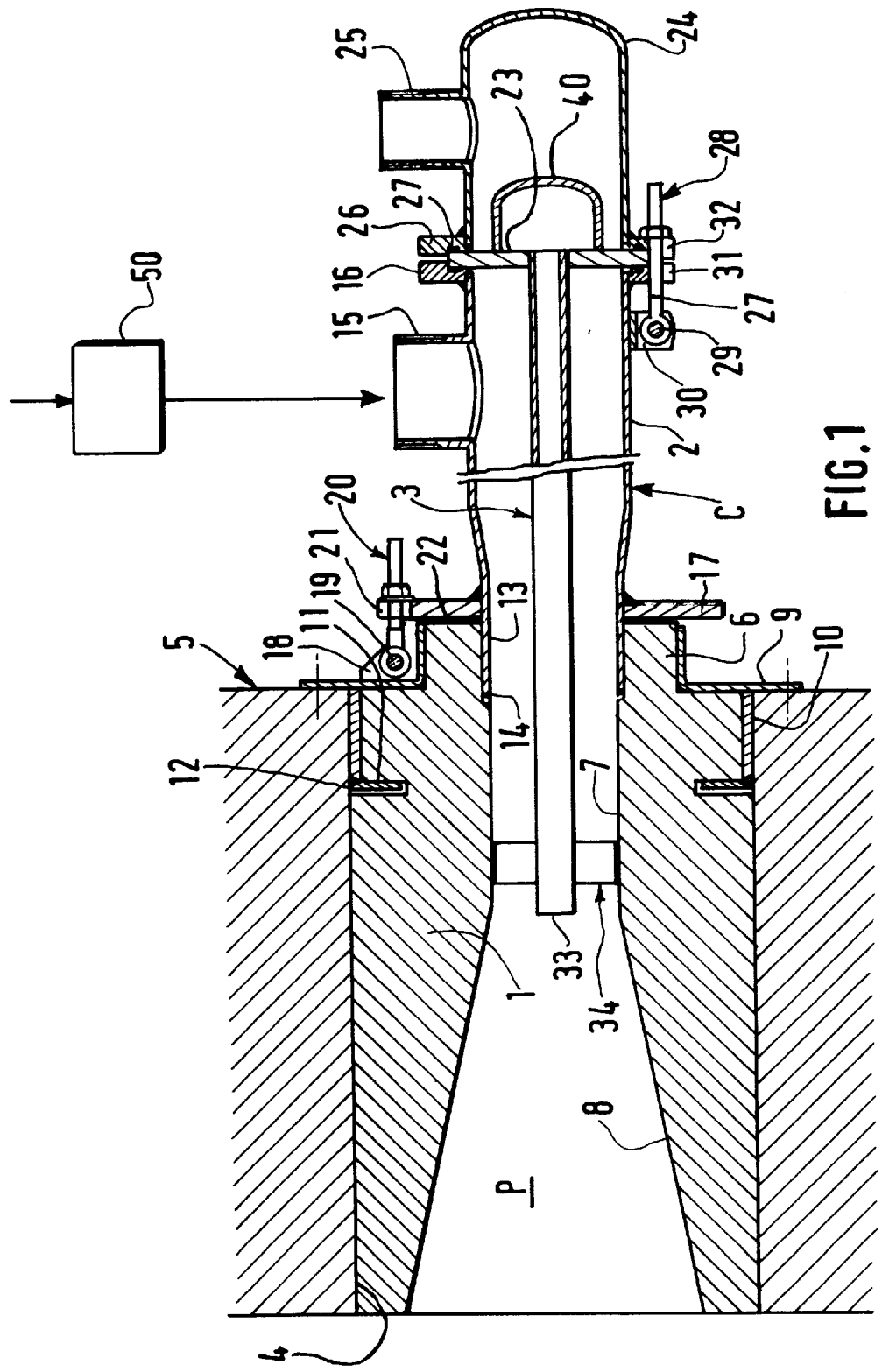
FIG. 1 is a diagrammatic longitudinal sectional view of a first embodiment of a burner according to the invention, using natural gas as fuel.

As shown in the figures, a burner according to the invention, of the type which is not water-cooled or air-cooled, essentially comprises a tap-hole block 1 to which is attached a burner body C supporting at least one internal injection pipe or blowpipe 3. The tap-hole block 1, made of refractory material, has a parallelepipedal general configuration and is intended to be housed in a transverse opening 4 in a wall 5 of a furnace, typically a glass furnace. The tap-hole block 1 has a projecting rear portion 6 of small transverse dimensions and is completely penetrated by a passage forming an internal cavity P and including a cylindrical upstream portion 7 which is connected to a downstream portion 8 having a cylindrical enlarged section or having an outwardly flaring profile, for example of conical shape, as shown, or having a partially paraboloidal profile. Arranged on the rear face of the block 1 are L-shaped angle irons 9 which clamp the end portion 6 and to the front faces of which are welded plates 10 extending longitudinally along the faces of the block 1 and terminating in tabs 11 which extend transversely inward and which are housed in transverse housings 12 formed around the periphery of the tap-hole block 1 and opening toward the outside of this tap-hole block.

The burner body C essentially consists of a metal tubular element 2 having two generally cylindrical portions, including a downstream end portion 13 of smaller diameter housed in the upstream end of the upstream tubular portion 7 of the cavity P of the tap-hole block, advantageously in a rear housing 14 of slightly enlarged diameter in this upstream portion 7, so as not to effect a discontinuity between the inside diameters of the downstream portion 13 of the tubular element 2 and the upstream portion 7 of the internal passage in the tap-hole block. A connecting pipe 15 is mounted laterally on the rear end portion of enlarged diameter of the tubular element 2 for connection, via quick connection means, to a circuit coming from a source 50 of a gas mixture enriched with oxygen. A peripheral flange 16 is fixed to the rear end of the tubular element 2 while a peripheral collar 17 is fixed around the downstream end 13. Fixed to the L-shaped angle irons 9 is at least one fitting 18 (typically three) serving as the support, articulated about a transverse pin 19, of a threaded tie rod 20 housed, in the assembly position, in a radial peripheral slot 21 in the collar 17 and enabling the latter, by tightening a bolt, to be pressed against the rear face of the tap-hole block 1 with insertion of a sealing material 22, in order thus to assemble, in an easily removable manner, the tap-hole block and the burner body 2.

In the embodiment in FIG. 1, the fuel injection blowpipe 3, coaxial with the tubular element 2 and defining at least one longitudinal through-passage, is mounted at its rear end in an annular plate 23 through which the internal passage of the injection blowpipe 3 emerges, rearward, into a feed chamber defined by a cap 24 which includes a pipe connector 25 for quick connection to a circuit coming from a source of gaseous fuel, typically natural gas, and the front end of which is provided with a peripheral flange 26 symmetrical with the flange 16 with respect to the plate 23. In the assembled position, the plate 23 is trained around its periphery, with the insertion of seals 27, between the two flanges 16 and 26, these being assembled, as is the tap-hole block 1, by at least one tie rod 28, typically three, each tie rod being mounted so as to pivot about a transverse pin 29 on a fitting 30 fixed on the outside to the wall of the tubular element 2 and being received, in the mounting configuration, in facing radial peripheral slots 31 and 32 formed respectively in the flanges 16 and 26.

The length of the injection blowpipe 3 is defined so that its downstream end 33, which may be that of several adjacent parallel injector pipes, lies beyond the end of the downstream portion 13 of the burner body. Fins 34 extending radially outward are mounted on the injection blowpipe 3, near its downstream end, so as to interact with the inner wall of the upstream portion 7 of the passage P and to provide centering of the blowpipe 3 in this passage P. The mounting plate 23 of the internal injection subassembly 3 includes, on its rear face, a handle 40, in the form of a lug or hoop, consisting, for example, of a shaped metal rod welded to the plate, enabling the individual subassembly 3 to be easily installed and extracted, even when hot.

Figure 2:
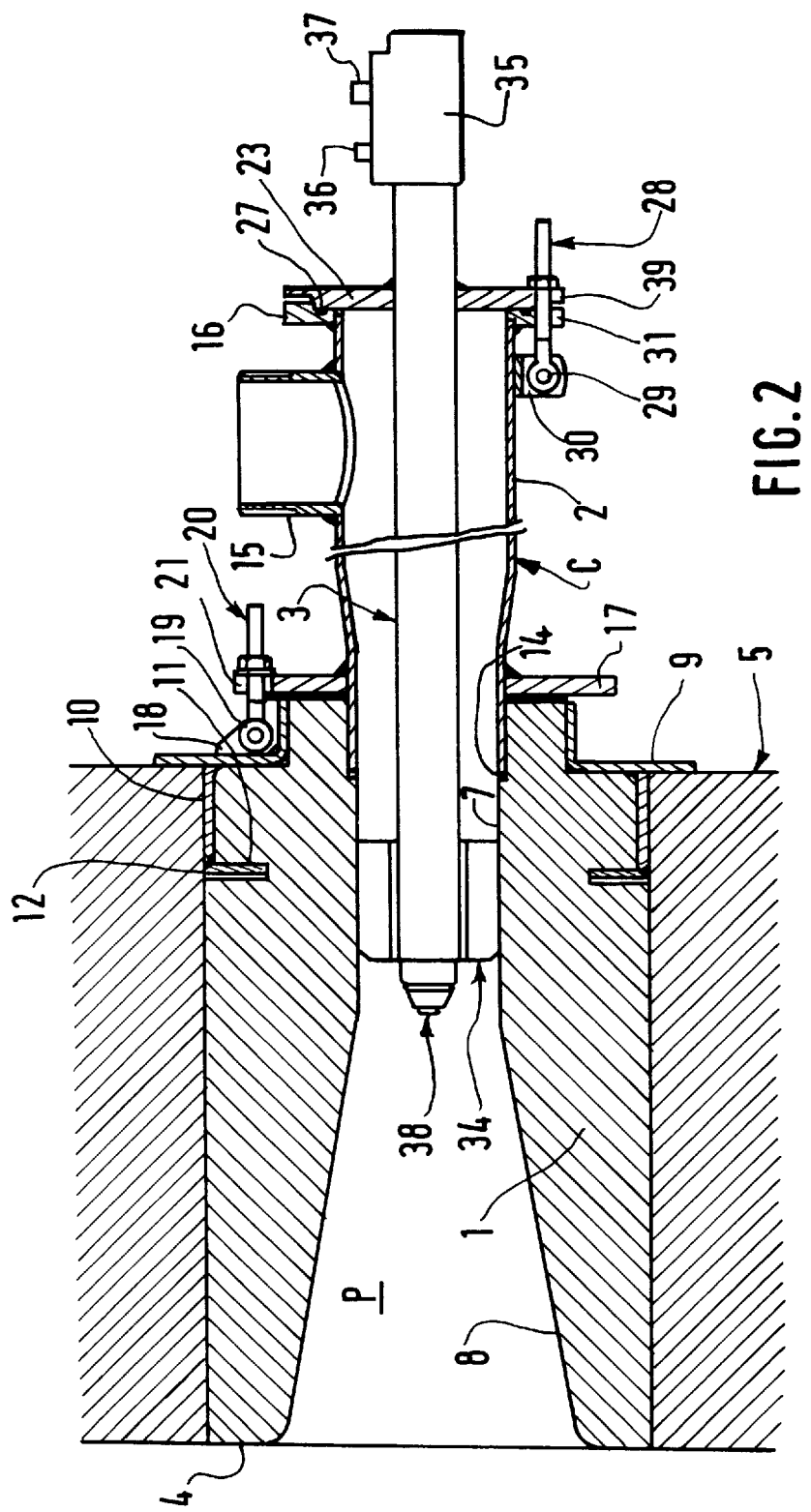
FIG. 2 is a view similar to FIG. 1 of a second embodiment of the invention, using an atomized liquid fuel.

The embodiment in FIG. 2 is distinguished from the previous one in that the injection blowpipe 3, provided in this case for the injection and atomization of a liquid fuel, for example fuel oil, is extended rearward, through the plate 23, to an end block 35 allowing handling and having connectors 36 and 37 for connection to steam or air and fuel oil sources respectively, these being conveyed via internal circuitry to the blowpipe 3 to a removable atomizer mounted at the downstream end of the blowpipe 3 and lying substantially at the junction between portions 7 and 8 of the passage P. In this embodiment, it is the plate 23 which interacts directly, bearing in a sealed manner, with insertion of a seal 27, with the flange 16 at the rear of the burner body 2, the annular plate 23 being provided in this case with the radial peripheral housing 39 facing the housing 31 in order to house the tie rod 28.

FIG. 3 shows an embodiment of an oxyburner burning gaseous fuel, similar to that of FIG. 1 but in which the fuel injection assembly 3 includes, in this case, several angularly spaced parallel pipes which are mounted in the plate 23 and each front end of which supports a spacing and centering fin 34. The spacing and parallelism of the injection pipes 1 are furthermore provided by a central tubular spacer 41 fastened to the various ends of the pipes. As may be seen in FIG. 3, the front ends of the injection pipes, as in the embodiment having a central pipe in FIG. 1, advantageously consist, like the spacers 34 and 41, of a nozzle 42 made of temperature-resistant metal, for example INCONEL 600 or PM 2000. The mounting of the plate 23 on the burner body C is similar to that described previously described in relation to FIG. 1.

As will have been noted from the preceding description, the choice of mode of fuel ejection and the adaptation from one fuel to another simply require changing the injection pipe subassembly 3, the other components of the burner remaining unchanged. In addition, the mounting/demounting of the injection subassembly with respect to the burner body and/or the mounting/demounting of the burner body (or of the burner body/injection blowpipe assembly) with respect to the tap-hole block 1 are carried out very quickly and simply, even by an unskilled person. Finally, the mounting of the burner body on the tap-hole block by means of catching tabs 12 guarantees lasting fixture, free from the danger of oxidation and also allowing recovery and/or recycling of all the assembly parts.

This versatility of the oxyfuel burner according to the invention makes it possible for it to be adapted to many uses and, in particular, to operate, over a wide range of fuel/oxidizing-agent pairs, at low impulse, that is to say for example with relatively low oxidizing gas pressures, for example of the order of 2500 Pa (relative), which makes it particularly suitable for feeding with low-purity (between 90 and 95%) oxygen provided on site by an oxygen production unit 50 operating by adsorption, of the so-called PSA or VSA type.

Although the invention has been described in relation to particular embodiments, it is not limited by them but, on the contrary, is capable of modifications and of variants which may be apparent to those skilled in the art.

We claim:
1. A burner comprising:
   a burner body capable of being mounted on a tap-hole block made of a refractory material, the tap-hole block defining a burner cavity, the burner body including a tubular element;
   at least one internal injection pipe fastened at a first end to a supporting structure;
   spacing and centering means provided at a second end of the internal injection pipe;
   quick mounting means for quickly mounting the supporting structure of the internal injection pipe on the tubular element of the burner body; and
   a rear cap forming a feed chamber for the internal injection pipe, the rear cap including means for connection to a fluid circuit and means for connection to a portion of the first quick mounting means.

2. The burner according to claim 1, wherein the supporting structure of the internal injection pipe includes means for handling the internal injection pipe.

3. The burner according to claim 1, further comprising a first reinforcement mounted around the tubular element, a second reinforcement mounted on the tap-hole block, and a second quick mounting means for connecting the first and second reinforcements.

4. The burner according to claim 3, wherein the second quick mounting means includes at least one swinging threaded tie rod.

5. The burner according to claim 1, wherein the injection pipe projects axially from the tubular element.

6. A glass furnace comprising:
   a tap-hole block made of a refractory material, the tap-hole block defining a burner cavity:
   a burner body mounted on the tap-hole block, the burner including a tubular element;
   at least one internal injection pipe fastened at a first end to a supporting structure;
   spacing and centering means provided at a second end of the internal injection pipe;
   means for quickly mounting the supporting structure of the internal injection pipe on the tubular element of the burner body; and
   a rear cap forming a feed chamber for the internal injection pipe, the rear cap including means for connection to a fluid circuit and means for connection to a portion of the first quick mounting means.

7. The glass furnace according to claim 6, wherein the burner body is attached to a supply of gaseous oxidizing agent containing at least 90% oxygen.

8. The glass furnace according to claim 7, wherein the gaseous oxidizing agent is provided by an air separation unit operating by adsorption.

9. The glass furnace according to claim 6, wherein the supporting structure of the internal injection pipe includes means for handling the internal injection pipe.

10. The burner according to claim 6, further comprising a first reinforcement mounted around the tubular element, a second reinforcement mounted on the tap-hole block, and a second quick mounting means for connecting the first and second reinforcements.

11. The burner according to claim 10, wherein the second quick mounting means includes at least one swinging threaded tie rod.

12. The burner according to claim 6, wherein the injection pipe projects axially from the tubular element into the burner cavity.

* * * * *